(12) United States Patent
Deneszczuk et al.

(10) Patent No.: US 8,602,930 B2
(45) Date of Patent: Dec. 10, 2013

(54) DRIVE BELT TENSIONER FOR MOTOR GENERATOR UNIT

(75) Inventors: William C. Deneszczuk, Saline, MI (US); Joel M. Maguire, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 418 days.

(21) Appl. No.: 12/562,228

(22) Filed: Sep. 18, 2009

(65) Prior Publication Data

US 2011/0070985 A1    Mar. 24, 2011

(51) Int. Cl.
*F16H 7/10* (2006.01)
*F16H 7/12* (2006.01)

(52) U.S. Cl.
USPC .................. 474/135; 474/112; 474/133

(58) Field of Classification Search
USPC ................ 474/135, 112, 133, 351
See application file for complete search history.

(56) References Cited

U.S. PATENT DOCUMENTS

| | | | |
|---|---|---|---|
| 3,864,986 A * | 2/1975 | Bochan | 474/109 |
| 4,019,397 A * | 4/1977 | Bochan | 474/109 |
| 4,758,208 A * | 7/1988 | Bartos et al. | 474/135 |
| 6,511,393 B1 * | 1/2003 | Bogl et al. | 474/101 |
| 6,648,783 B1 * | 11/2003 | Bogner | 474/134 |
| 6,652,401 B2 * | 11/2003 | Liu | 474/134 |
| 6,857,978 B2 * | 2/2005 | Polster et al. | 474/134 |
| 2003/0109342 A1 * | 6/2003 | Oliver et al. | 474/134 |
| 2006/0287146 A1 * | 12/2006 | McVicar et al. | 474/109 |
| 2008/0139354 A1 * | 6/2008 | Bogner | 474/134 |

FOREIGN PATENT DOCUMENTS

DE    10044645 A1    3/2002

OTHER PUBLICATIONS

Chinese Office Action for Application No. 201010287812.0 dated Mar. 4, 2013; 6 pages.

* cited by examiner

*Primary Examiner* — William A Rivera
*Assistant Examiner* — Henry Liu
(74) *Attorney, Agent, or Firm* — Cantor Colburn LLP

(57) ABSTRACT

A drive belt tensioner assembly for a motor-generator unit is comprises a motor-generator unit having a rotatable drive pulley, configured to engage a drive belt, extending therefrom. A drive belt assembly housing is fixed to the motor-generator unit and has an inner surface defining an opening through which the rotatable drive pulley of the motor-generator unit extends. A tensioner mounting ring is mounted to, and rotatable with respect to, the drive belt assembly housing. A tensioner pulley is mounted for rotation on the tensioner mounting ring and is configured to engage the drive belt on a side of the motor-generator unit drive pulley. A biasing assembly having a first end mounted to the tensioner mounting ring and a second end mounted in a fixed relationship to the motor-generator unit exerts a biasing force on the tensioner mounting ring to rotate the ring and the tensioner pulley against the drive belt.

18 Claims, 4 Drawing Sheets

US 8,602,930 B2

DRIVE BELT TENSIONER FOR MOTOR GENERATOR UNIT

FIELD OF THE INVENTION

The invention relates to internal combustion engines and, more particularly, to an engine accessory drive system and drive belt tensioner for such drive system.

BACKGROUND

The statements in this section merely provide background information related to the present disclosure and may, or may not constitute prior art.

Belt Alternator Starter ("BAS") powertrain systems for hybrid vehicles differ from conventional, non-hybrid systems in that the driving force or torque required to turn the accessory drive belt and related accessories is not always generated from the engine crankshaft through a crankshaft pulley. During engine operation, the engine crankshaft provides the driving force or torque for rotating a Motor Generator Unit ("MGU"), or starter generator, generally providing for taut and slack sides of the drive belt on opposites sides of an MGU pulley. During engine starting using the MGU however, the MGU drives the accessory drive belt and related accessories causing the slack side of the belt to switch to the opposite side of the MGU pulley. Accordingly, belt tensioners are generally required in such systems as are idler pulleys that are used to shorten drive belt spans to thereby minimize the potential for drive belt slack and resulting slippage.

During engine driven operation of the MGU and other accessories, the loads that are placed on the drive belt are determined by the power that is required to drive the accessories, including the MGU unit. The accessory drive loads are relatively light and, accordingly, require moderate to low drive belt tensioning to avoid belt slippage. On the other hand, during engine starting using the MGU, the MGU must supply sufficient power to rotate the engine (crankshaft, pistons, camshafts, etc.) as well as the accessories. Engine starts therefore require a significantly higher level of drive belt tensioning to control motion on the slack side of the belt and to ensure that the belt will not slip. Because of engine packaging requirements, it is common to provide separate tensioner and idler arms and pulleys with different pivot locations to attain the necessary drive belt geometry for proper performance and durability. Multiple tensioners, idler arms and pulleys may increase the space required for the accessory drive system which can adversely impact the packaging of the BAS powertrain system in some vehicle architectures.

SUMMARY

In an exemplary embodiment a drive belt tensioner assembly for a motor-generator unit is provided. The assembly comprises a motor-generator unit having a rotatable drive pulley, configured to engage a drive belt, extending therefrom. A drive belt assembly housing is fixed to the motor-generator unit and has an inner surface extending circumferentially to define an opening through which the rotatable drive pulley of the motor-generator unit extends. A tensioner mounting ring is mounted to, and rotatable with respect to, the drive belt assembly housing. A first tensioner pulley is mounted for rotation on the tensioner mounting ring and is configured to engage the drive belt on a first side of the motor-generator unit drive pulley and a biasing assembly having a first end mounted to the tensioner mounting ring and a second end mounted in a fixed relationship to the motor-generator unit exerts a biasing force on the tensioner mounting ring to rotate the tensioner mounting ring and the first tensioner pulley against the drive belt.

In another exemplary embodiment, an accessory drive system for an engine having a motor-generator for driving and being driven by the engine is provided. The accessory drive system comprises a first driven pulley connected with an engine crankshaft and rotatable therewith, a second driven pulley, connected with the motor-generator and rotatable therewith and a drive belt connecting the first driven pulley and the second driven pulley for driving either pulley from the other pulley. A drive belt tensioner assembly is mounted to the motor generator unit and comprises a drive belt assembly housing fixed to the motor-generator unit and having an inner surface extending circumferentially to define an opening through which the second driven pulley of the motor-generator unit extends. A tensioner mounting ring is mounted to, and rotatable with respect to, the drive belt assembly housing. A first tensioner pulley is mounted for rotation on the tensioner mounting ring and is configured to engage the drive belt on a first side of the motor-generator unit drive pulley and a biasing assembly having a first end mounted to the tensioner mounting ring and a second end mounted in a fixed relationship to the motor-generator unit is configured to exert a biasing force on the tensioner mounting ring to rotate the tensioner mounting ring and the first tensioner pulley against the drive belt.

The above features and advantages, and other features and advantages of the present invention are readily apparent from the following detailed description of the best modes for carrying out the invention when taken in conjunction with the accompanying drawings.

DESCRIPTION OF THE EMBODIMENTS

Figure 1:
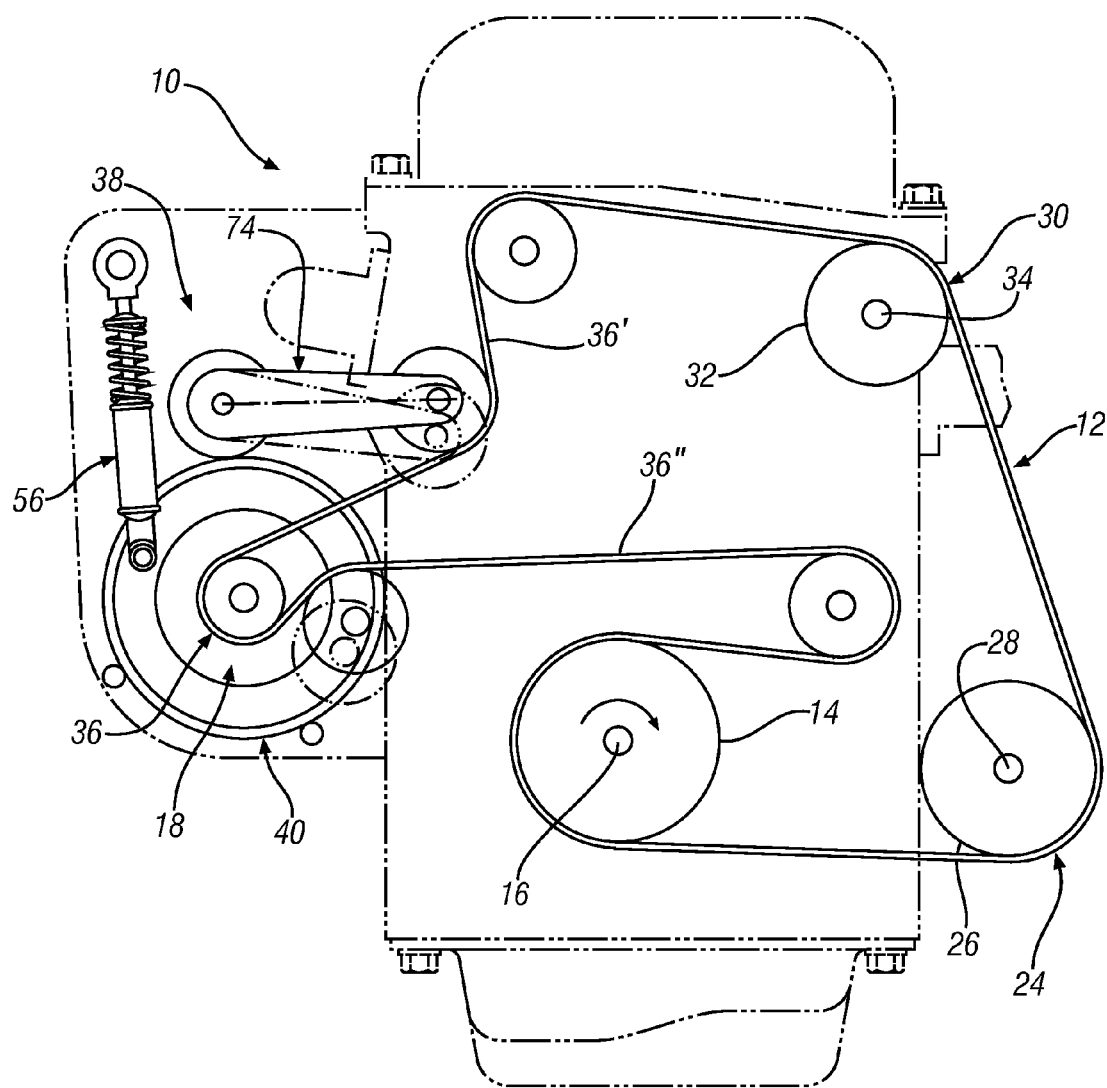
FIG. 1 is a front view of an engine system that embodies features of the present invention.

The following description is merely exemplary in nature and is not intended to limit the present disclosure, application or uses. It should be understood that throughout the drawings, corresponding reference numerals indicate like or corresponding parts and features.

In accordance with an exemplary embodiment, FIG. 1 schematically illustrates an engine 10, for a hybrid vehicle (not shown) having a Belt Alternator Starter ("BAS") accessory drive 12. The BAS accessory drive system 12 includes an engine accessory drive pulley 14 mounted for rotation on the end of an engine crankshaft 16. A Motor Generator Unit ("MGU") 18 includes an electric machine that can be driven to act as an electric generator to produce electric power, or may use electric power to drive the engine 10 as a starter. MGU 18, operative as a starter/generator, is mounted to the engine 10 at a lateral distance from the engine drive pulley 14 and includes an MGU drive pulley 20, FIG. 2, mounted for rotation on the shaft 22 of the MGU 18. An air conditioner compressor 24 may also be mounted to the engine 10 and includes an air conditioner drive pulley 26 mounted for clutched rotation on the shaft 28 of the air conditioner compressor 24. In addition, a water pump 30 is mounted to the engine 10 and similarly includes a water pump drive pulley 32 mounted for rotation on the shaft 34 of the water pump impeller (not shown). Other similarly mounted engine accessories, such as an air pump or a power steering pump, as examples, may also be associated with the BAS accessory drive system 12. An accessory drive belt 36 extends between and engages all of the drive and driven pulleys 14, 20, 26, 32 for rotating together the engine crankshaft 16, the MGU 18, the air conditioner compressor 24, the water pump 30 and any other optional accessories.

The MGU 18 serves both as a generator, when the engine is running and producing mechanical power needed to spin the electric machine and to convert the mechanical power into electrical power in a generating mode, and as a starting motor when the engine is off, the vehicle is operating in a hybrid mode, and the electric machine is used to spin the engine 10 in a starting mode. The MGU 18 is "driven" by drive belt 36 in the generating mode but "drives" the belt in the engine starting or cranking mode. In the generating mode, the upper run or span 36' of the drive belt 36 is tight while the lower run or span 36" is slack. The situation is reversed during the starting or cranking mode so that the upper run 36' is slack, while the lower run 36" is tight. To properly tension the drive belt 36, the BAS accessory drive system 12 includes one or more tensioners and idler pulleys in order to prevent slippage of the drive belt when the MGU 18 is in either the driven or driving mode.

Figure 2:
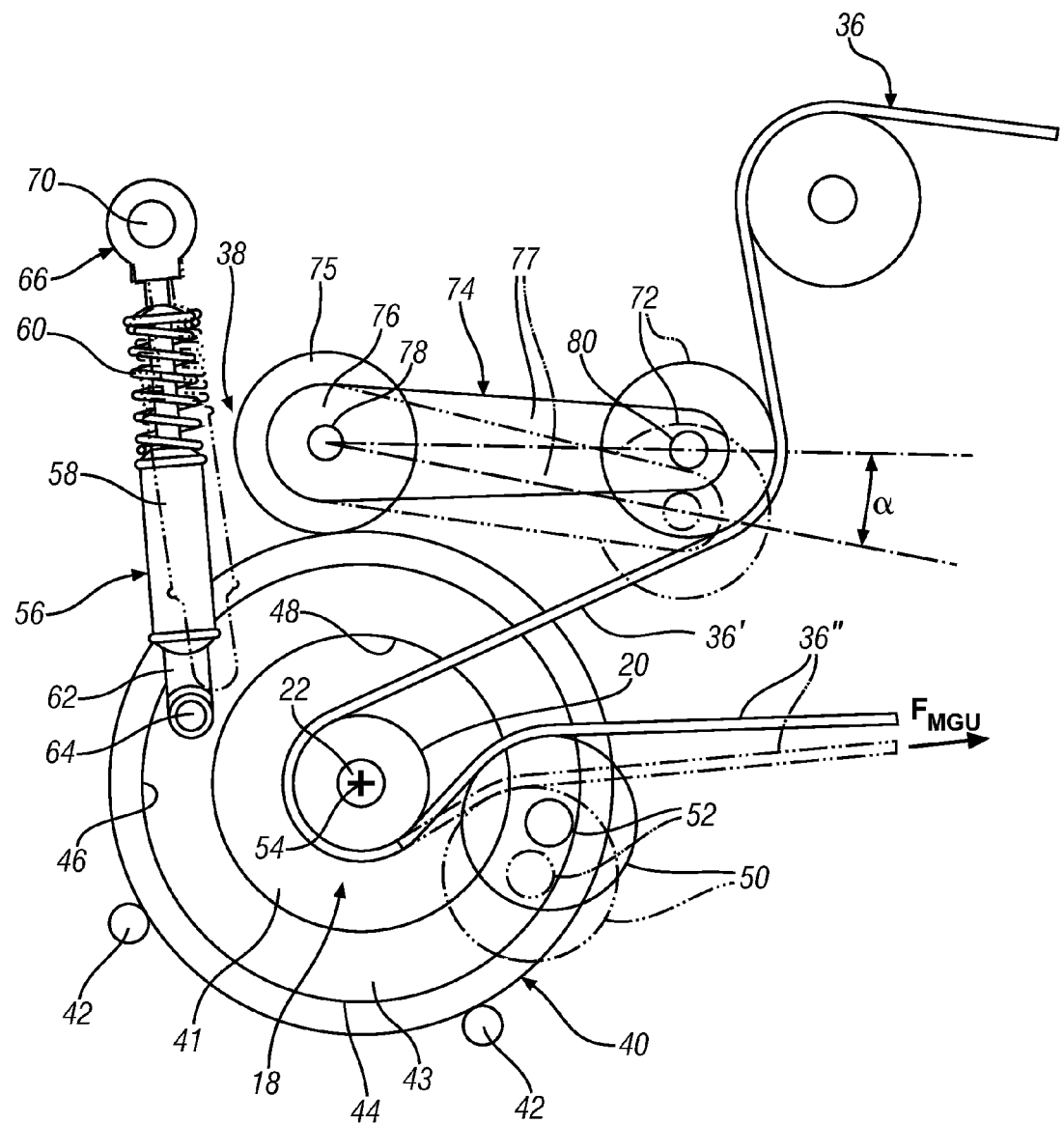
FIG. 2 is an enlarged view of a drive belt tensioner assembly shown in FIG. 1.

Referring to FIGS. 1 and 2, in an exemplary embodiment a drive belt tensioner assembly 38 is assembled to the MGU 18 and includes an outer housing 40 which may be constructed integrally with the MGU housing 41 or may be attached to the MGU housing at attaching points or bosses 42 such that the drive belt assembly outer housing 40 is fixed (rotationally) relative to the MGU 18. Disposed for rotation within the drive belt assembly outer housing 40 is a tensioner mounting ring 43. The tensioner mounting ring 43 may ride on bearings (not shown) which are disposed between its outer surface 44 and the inner surface 46 of the drive belt assembly outer housing 40. As a result the outer housing 40 functions in much the same way as the outer race of a roller bearing as it supports the rotatable tensioner mounting ring 43 therein.

In an exemplary embodiment, the MGU shaft 22 and MGU drive pulley 20 extend through the inner circumference 48 of the tensioner mounting ring 43 in order for the MGU drive pulley to engage the accessory drive belt 36 and thereby define the upper and the lower drive belt spans or runs 36' and 36", respectively. The tensioner mounting ring 43 includes a first tensioner pulley 50 that is mounted for rotation on a shaft 52 that is fixed to the mounting ring and extends outwardly therefrom in parallel to the axis 54 of the MGU shaft 22. The first tensioner pulley 50 engages the lower run 36" of the accessory drive belt 36 and, upon rotation of the tensioner mounting ring 43 within the drive belt assembly outer housing 40 the tensioner pulley is allowed to move in a planetary relationship with respect to the MGU shaft axis 54 and associated MGU drive pulley 20.

Also mounted to the tensioner mounting ring 43 is a biasing assembly 56 which, in an exemplary embodiment, may be in the form of a hydraulic strut comprising a central hydraulic cylinder 58 surrounded by a compression coil spring 60. The biasing assembly 56 is pivotally connected to the tensioner mounting ring 43 at a first end 62 by a pivot pin 64 that is fixed to the tensioner mounting ring. A second end 66 of the biasing assembly 56 is pivotally connected, by a second pivot pin 70 to an external mounting point that may be located on the engine 10 or may include an extension of the drive belt assembly outer housing 40 or the MGU housing 41, such that the mounting point is in a fixed relationship to the MGU 18. The biasing assembly 56 is configured so that the compression coil spring 60 continuously biases against the first and second pivot pins 64, 70 so as to extend the central hydraulic cylinder 58 in a direction toward which the central hydraulic cylinder is internally designed to move freely. The extending bias of the biasing assembly 56 operates to urge the tensioner mounting ring 43 rotationally within the drive belt assembly outer housing 40 along with the associated tensioner pulley 50 against the lower run 36" of the drive belt 36 to maintain tension in the lower run 36" when the MGU 18 is in the crankshaft driven, electric generating mode. However, the central hydraulic cylinder 58 includes internal velocity sensitive damping features (not shown) that limit the rate of compression caused by forces, which may act against it.

In an exemplary embodiment, a tensioner arm 74 has a first end 76 mounted to a support boss 75 that may extend from the drive belt assembly outer housing 40 or the engine 10, for rotation about pivot pin 78. A second tensioner pulley 72 is mounted to a second end 77 of the tensioner arm 74 for rotation about a shaft 80. The second tensioner pulley 72 of the drive belt tensioner assembly 38 is biased against the upper run 36' of the drive belt 36 by a biasing member such as a concentric coil spring extending about pivot pin 78 (not shown), that acts on tensioner arm 74, and operates through a range of rotation "α" to maintain tension in the upper run 36' when the MGU 18 is operating in the engine starting or cranking mode.

As illustrated in FIG. 2, during normal operation of the engine assembly 10 (i.e. crankshaft driven MGU 18), the tensioner pulley 50 of the drive belt tensioner assembly 38 tensions lower drive belt span 36" with a force, determined by the compression coil spring 60, sufficient to take up any slack in the belt span. Concurrently, the second tensioner pulley 72 rides against the drive belt 36 on the opposite side of the MGU drive pulley 20 on the tensioned belt span 36'. The positions of the tensioner pulley 72, the tensioner pulley 50, and consequently the tensioner mounting ring 43, remain relatively constant during normal, steady-state engine operation and the tensioner forces applied to the drive belt 36 are sufficient to control both belt runs 36' and 36" during such operation when the engine is driving the various accessories and the MGU 18. In this mode, the forces that are acting on the bearing systems of the various pulleys and accessories are subject to moderate loads sufficient only to drive the accessories and the MGU 18, without belt slippage, from the engine drive pulley 14.

As illustrated in phantom in FIG. 2, in the case of rapid engine speed changes during transient operation of the engine assembly 10 or, upon transition of the MGU 18 from the driven mode to the engine cranking or starting mode, the biasing force of the compression coil spring 60 is insufficient to maintain the tensioner pulley 50 in position against the force (" $F_{MGU}$ ") exerted on the lower belt run 36". Under the latter, relatively short period of operation of the BAS accessory drive system 12, the biasing assembly 56 applies a hydraulic damping force to the tensioner mounting ring 43, and associated first tensioner pulley 50, that restrains contraction of the biasing assembly 56 to a slow rate of change, thus applying velocity sensitive damping to the BAS accessory drive system 12. The central hydraulic cylinder 58 thus applies a restraining force opposing compression of the coil spring 60 and, consequently, movement of the tensioner mounting ring 43 and associated tensioner pulley 50 resulting from the increase in force $F_{MGU}$ applied on the belt 36 in the lower belt run 36" so that the tensioner mounting ring 43, and associated tensioner pulley 50, are allowed to move within the drive belt assembly outer housing 40 at only a very slow rate. In this operational mode, the initial position of the tensioner pulley 50 is changed a relatively small amount during the relatively short engine starting period in which the belt tension in the lower run 36" is significantly increased. At the same time, the second tensioner pulley 72 is pivoted downwardly by the biased tensioner arm 74 into the upper span 36' as necessary to take up the increased slack in the span while the engine 10 is being started by the MGU 18.

Figure 3:
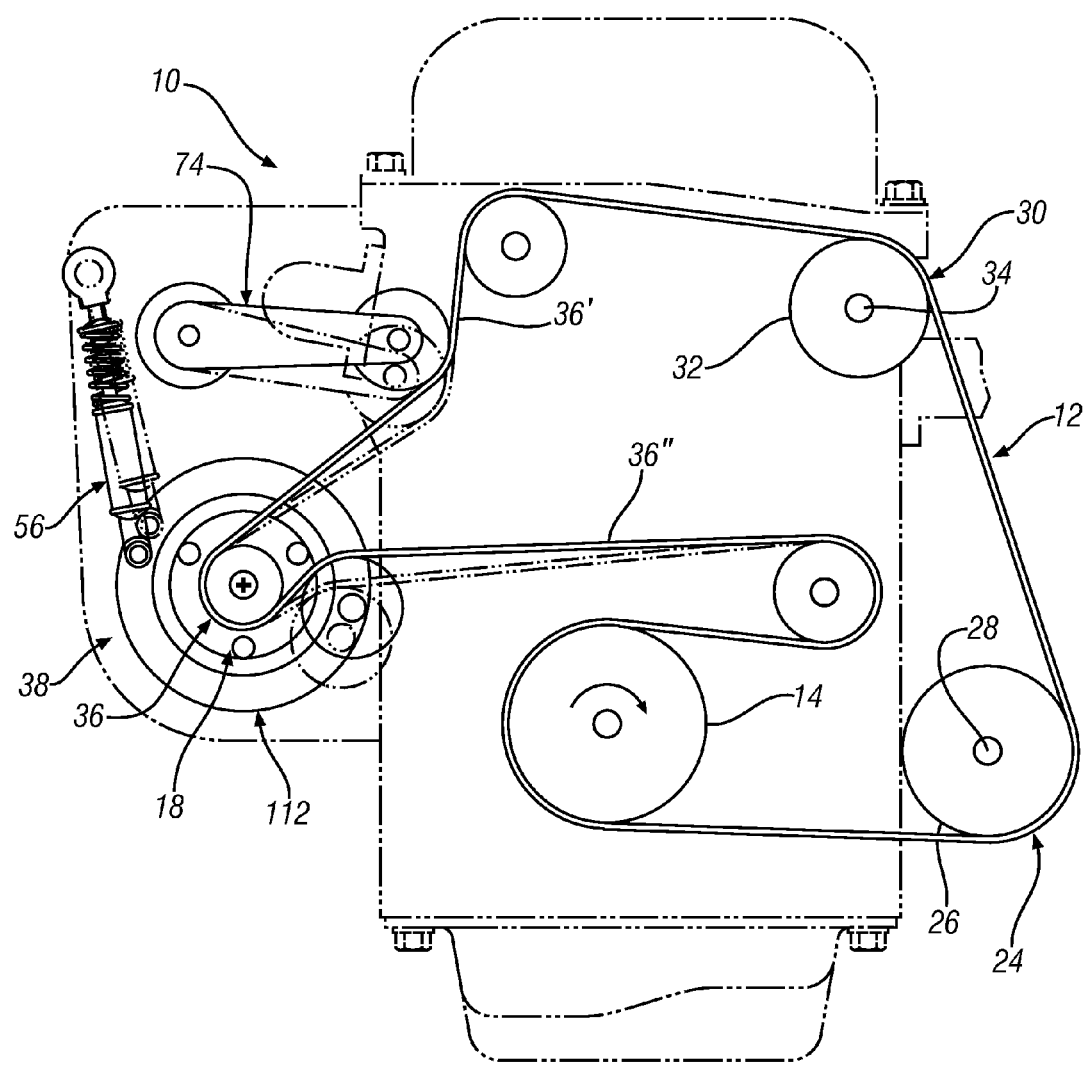
FIG. 3 is a front view of an engine system that embodies features of another embodiment of the present invention.
Figure 4:
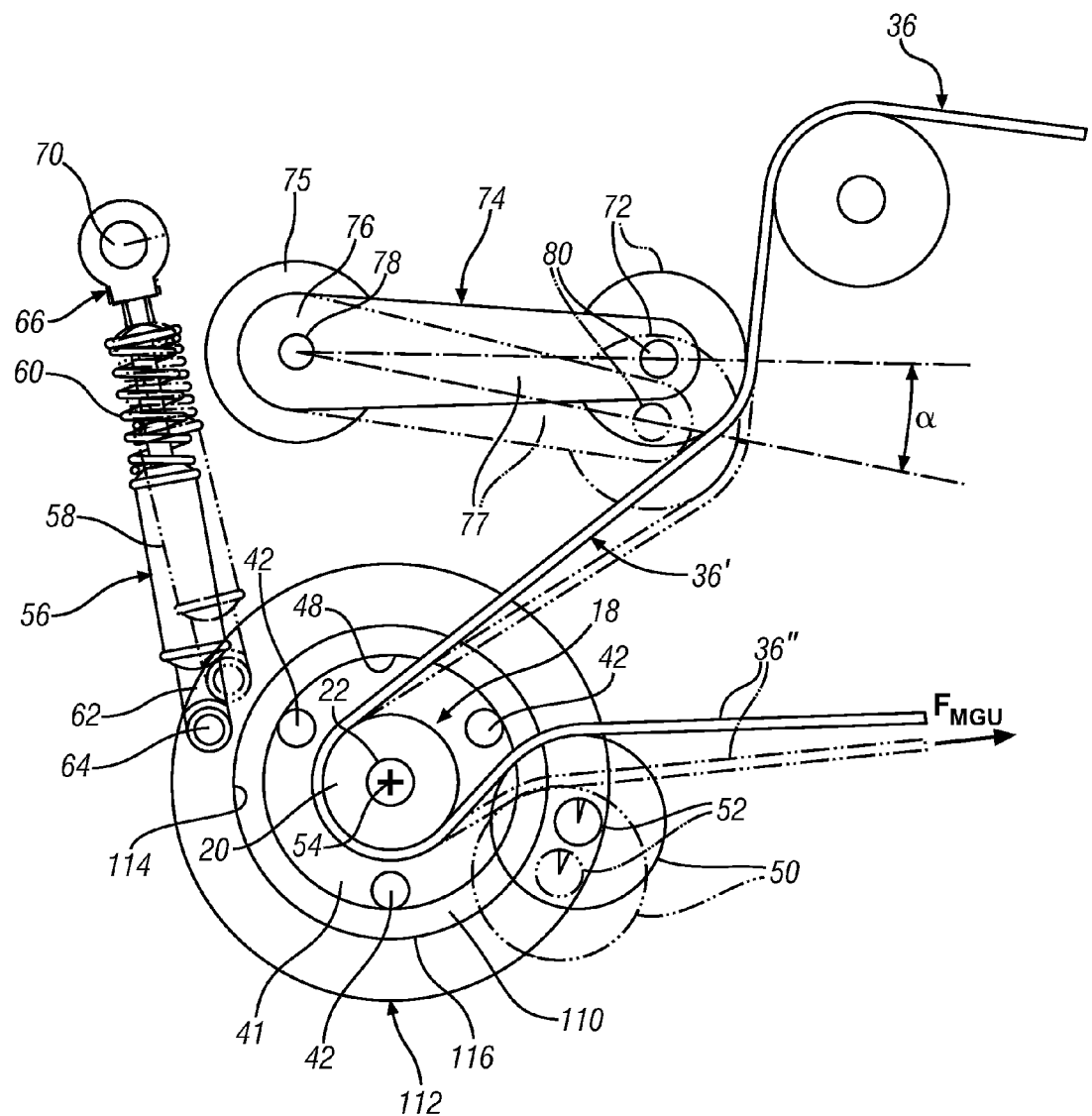
FIG. 4 is an enlarged view of a drive belt tensioner assembly shown in FIG. 3.

In another exemplary embodiment illustrated in FIGS. 3 and 4, a drive belt tensioner assembly 38 is assembled to the MGU 18 and includes a drive belt assembly inner housing 110 which may be constructed integrally with the MGU housing 41 or may be attached to the MGU housing at attaching points or bosses 42 such that the drive belt assembly inner housing 110 is fixed (rotationally) relative to the MGU 18. Disposed for rotation about the outer circumference of the drive belt assembly inner housing 110 is a tensioner mounting ring 112. The tensioner mounting ring 112 may ride on bearings (not shown) which are disposed between its inner surface 114 and the outer surface 116 of the drive belt assembly inner housing 110. As a result the drive belt assembly inner housing 110 functions in much the same way as the inner race of a roller bearing as it supports the rotatable tensioner mounting ring 112 for rotation thereon.

In an exemplary embodiment, the MGU shaft 22 and MGU drive pulley 20 extend through the inner circumference 48 of the inner tensioner assembly housing 110 in order for the MGU drive pulley to engage the accessory drive belt 36 and define the upper and the lower drive belt spans or runs 36' and 36", respectively. The tensioner mounting ring 112 includes a tensioner pulley 50 that is mounted for rotation on a shaft 52 that is fixed to the mounting ring and extends outwardly therefrom in parallel to the axis 54 of the MGU shaft 22. The tensioner pulley 50 engages the lower run 36" of the accessory drive belt 36 and, upon rotation of the tensioner mounting ring 112 about the outer circumference of the drive belt assembly inner housing 110, the tensioner pulley 50 is allowed to move in a planetary relationship with respect to the MGU shaft axis 54 and associated MGU drive pulley 20.

Also mounted to the tensioner mounting ring 112 is a biasing assembly 56 which, in an exemplary embodiment may be in the form of a hydraulic strut comprising a central hydraulic cylinder 58 surrounded by a compression coil spring 60. The biasing assembly 56 is pivotally connected to the tensioner mounting ring 112 at a first end 62 by a pivot pin 64 that is fixed to the tensioner mounting ring. A second end 66 of the biasing assembly 56 is pivotally connected, by a second pivot pin 70, to an external mounting point that may be disposed on the engine 10 or may include an extension of the MGU housing 4, such that the mounting point is in a fixed relationship to the MGU 18. The biasing assembly 56 is configured so that the compression coil spring 60 continuously biases against the first and second pivot pins 64, 70 so as to urge the central hydraulic cylinder 58 in an extending direction toward which the central hydraulic cylinder is internally designed to move freely. The extending bias of the biasing assembly 56 operates to urge the tensioner mounting ring 112 rotationally about the drive belt assembly inner housing 110 in a counter clockwise direction (as viewed in the figures) to urge the associated tensioner pulley 50 against the lower run 36" of the drive belt 36 to maintain tension in the lower run 36" when the MGU 18 is in the crankshaft driven, electric generating mode. However, the central hydraulic cylinder 58 includes internal velocity sensitive damping features (not shown) that limit the rate of compression caused by forces which may act against it.

In an exemplary embodiment, a tensioner arm 74 has a first end 76 mounted to a support boss 75 of the engine 10 for rotation about pivot pin 78. A second tensioner pulley 72 is mounted to a second end 77 of the tensioner arm 74 for rotation about a shaft 80. The second tensioner pulley 72 of the drive belt tensioner assembly 38 is biased against the upper run 36' of the drive belt 36 by a biasing member such as a concentric coil spring extending about pivot pin 78 (not shown), that acts on tensioner arm 74, and operates through a range of rotation "α" to maintain tension in the drive belt upper run 36'.

As illustrated in FIG. 4, during normal operation of the engine assembly 10 (crankshaft driven MGU 18), the tensioner pulley 50 of the drive belt tensioner assembly 38 tensions lower drive belt span 36" with a force, determined by the compression coil spring 60, sufficient to take up any slack in the belt span. At the same time, the second tensioner pulley 72 rides against the drive belt 36 on the opposite side of the MGU drive pulley 20 on the tensioned belt span 36'. The positions of the tensioner pulley 72, the tensioner pulley 50, and consequently the tensioner mounting ring 112, remain relatively constant during normal, steady-state engine operation and the tensioner forces applied to the drive belt 36 are relatively moderate, though sufficient to control both belt runs 36' and 36" during such operation when the engine is driving the various accessories and the MGU 18. In this manner the forces that are acting on the bearing systems of the various pulleys and accessories are subject to moderate loads sufficient only to drive the accessories and the MGU 18 from the engine drive pulley 14, without drive belt slippage, thereby reducing potentially wear inducing forces on the shaft bearings of the various engine accessories.

As illustrated in phantom in FIG. 4, in the case of rapid engine speed changes during transient operation of the engine assembly 10 or, upon transition of the MGU 18 from the driven mode to the engine cranking or starting mode, the biasing force of the compression coil spring 60 is insufficient to maintain the tensioner pulley 50 in position against the force ("$F_{MGU}$") exerted on the lower belt run 36". Under the latter, relatively short period of operation of the BAS accessory drive system 12, the central hydraulic cylinder 58 of the biasing assembly 56 applies a hydraulic damping force to the biasing assembly that restrains contraction of the compression coil spring 60 to a slow rate of change, thus applying velocity sensitive damping to the BAS accessory drive system 12. The central hydraulic cylinder 58 thus applies a restraining force opposing movement of the tensioner mounting ring 112 and associated tensioner pulley 50 resulting from the increase in force applied on the belt 36 in the lower belt run 36" so that the tensioner mounting ring 112 and associated tensioner pulley 50 are allowed to move about the drive belt assembly inner housing 110 at only a very slow rate. In this operational mode, the initial position of the tensioner pulley 50 is changed a relatively small amount during the relatively short engine starting cycle in which the belt tension in the lower run 36" is significantly increased. At the same time, the second tensioner pulley 72 is pivoted downwardly by the biased tensioner arm 74 into the upper span 36' as necessary to take up the increased slack in the span while the engine 10 is being started by the MGU 18.

By providing an MGU mounted drive belt tensioner assembly 38 that includes multiple tensioner pulleys 50 and 72 that are operable to maintain the proper tension in both upper and lower runs 36' and 36" of the accessory drive belt 36 a single assembly may be used for multiple BAS hybrid engine applications without the need for major repackaging efforts or engine modifications for each engine/vehicle application.

The exemplary MGU mounted drive belt tensioner assemblies 38 may be supplied to the engine or vehicle assembly plant as virtually a single unit that can be used for multiple BAS hybrid engine applications with only a re-tuning (based on engine power and other variables) of the damping/biasing characteristics of the central hydraulic cylinder 58 and compression coil spring 60. Such a tensioning device with near "universal" application can have the effect of pre-defining the front-of-engine packaging requirements thereby freeing up other packaging space for other engine technology enhancements.

Although the invention has been described primarily with reference to a BAS hybrid engine system is has been contemplated that there are applications for the invention in non-BAS systems that may require a high degree of short-term drive belt tensioning such as in higher performance engines in which rapid speed excursions may frequently be expected and, therefore the invention should not be limited to the descriptive embodiments included herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the present application.

What is claimed is:

1. A drive belt tensioner assembly for a motor-generator unit comprising:
    motor-generator unit having a drive pulley that is rotatable with a drive pulley shaft, the drive pulley being configured to engage a drive belt, extending therefrom;
    a drive belt assembly housing fixed to the motor-generator unit and having an inner surface that faces radially inward toward the drive pulley shaft, that extends circumferentially about the drive pulley, and that defines an opening through which the drive pulley shaft unit extends;
    a tensioner mounting ring disposed within, and rotatable with respect to, the inner surface, the tensioner mounting ring having an inner circumference through which the drive pulley shaft extends;
    a first tensioner pulley mounted for rotation about a first tensioner shaft that is fixed on the tensioner mounting ring and that extends from the tensioner mounting ring parallel to the drive pulley shaft, the first tensioner pulley being configured to engage the drive belt on a first side of the motor-generator unit drive pulley; and
    a biasing assembly having a first end mounted to the tensioner mounting ring and a second end mounted in a fixed relationship to the motor-generator unit, the biasing assembly being configured to exert a biasing force on the tensioner mounting ring to rotate the tensioner mounting ring and the first tensioner pulley against the drive belt.

2. The drive belt tensioner assembly for a motor-generator unit of claim 1, further comprising:
    a tensioner arm pivotally mounted, in fixed relationship with the motor generator unit, at a first end;
    a second tensioner pulley mounted for rotation at a second end of the tensioner arm and configured to engage the drive belt; and
    a biasing member associated with the tensioner arm and configured to bias the second tensioner pulley into engagement against the drive belt on a second side of the motor-generator unit drive pulley.

3. The drive belt tensioner assembly for a motor-generator unit of claim 2, wherein the tensioner arm is mounted to a support boss extending outwardly from the drive belt assembly housing.

4. The drive belt tensioner assembly for a motor-generator unit of claim 1, wherein the drive belt assembly housing is integral with a housing of the motor-generator unit.

5. The drive belt tensioner assembly for a motor-generator unit of claim 1, wherein the tensioner mounting ring is disposed for rotation within the drive belt assembly housing for rotation relative to the inner surface thereof and having a tensioner mounting ring inner surface extending circumferentially to define an opening through which the rotatable drive pulley of the motor-generator unit extends.

6. The drive belt tensioner assembly for a motor-generator unit of claim 1, wherein the tensioner mounting ring is disposed for rotation about an outer surface of the drive belt assembly housing for rotation relative thereto.

7. The drive belt tensioner assembly for a motor-generator unit of claim 6, further comprising:
    a tensioner arm pivotally mounted, in fixed relationship with the motor generator unit at a first end;
    a second tensioner pulley mounted for rotation at a second end of the tensioner arm and configured to engage the drive belt; and
    a biasing member associated with the tensioner arm and configured to bias the second tensioner pulley into engagement against the drive belt on a second side of the motor-generator unit drive pulley.

8. The drive belt tensioner assembly for a motor-generator unit of claim 1, wherein the biasing assembly further comprises:
    a biasing member exerting a biasing force on the tensioner mounting ring; and
    a dampening assembly associated with the biasing member to prevent rapid compression of the biasing member caused by rapid transient force input to the first tensioner pulley by the motor-generator unit acting on the drive belt.

9. The drive belt tensioner assembly for a motor-generator unit of claim 8, wherein the biasing member comprises a compression coil spring and the dampening assembly comprises a hydraulic cylinder configured to apply a velocity sensitive damping on the tensioner mounting ring.

10. An accessory drive system for an engine having a motor-generator unit for driving and being driven by the engine, the accessory drive system comprising:
    a first driven pulley connected with an engine crankshaft and rotatable therewith;
    a second driven pulley, connected with a second driven pulley shaft of the motor-generator unit and rotatable therewith;
    a drive belt connecting the first driven pulley and the second driven pulley for driving either pulley from the other pulley;
    a drive belt tensioner assembly mounted to the motor generator unit, the drive belt tensioner comprising:
    a drive belt assembly housing fixed to the motor-generator unit and having an inner surface that faces radially inward toward the second driven pulley shaft, that extends circumferentially about the drive pulley, and that defines an opening through which the second driven pulley shaft extends;

a tensioner mounting ring disposed within, and rotatable with respect to, the inner surface, the tensioner mounting ring having an inner circumference through which the second driven pulley shaft extends;

a first tensioner pulley mounted for rotation about a first tensioner shaft that is fixed on the tensioner mounting ring and that extends from the tensioner mounting ring parallel to the second driven pulley shaft, the first tensioner pulley being configured to engage the drive belt on a first side of the motor-generator unit drive pulley; and a biasing assembly having a first end mounted to the tensioner mounting ring and a second end mounted in a fixed relationship to the motor-generator unit, the biasing assembly being configured to exert a biasing force on the tensioner mounting ring to rotate the tensioner mounting ring and the first tensioner pulley against the drive belt.

11. The accessory drive system of claim 10, further comprising:

a tensioner arm pivotally mounted, in fixed relationship with the motor generator unit, at a first end;

a second tensioner pulley mounted for rotation at a second end of the tensioner arm and configured to engage the drive belt; and a biasing member associated with the tensioner arm and configured to bias the second tensioner pulley into engagement against the drive belt on a second side of the motor-generator unit drive pulley.

12. The accessory drive system of claim 11, wherein the tensioner arm is mounted to an integral boss extending outwardly from the drive belt assembly housing.

13. The accessory drive system of claim 10, wherein the drive belt assembly housing is integral with a housing of the motor-generator unit.

14. The accessory drive system of claim 10, wherein the tensioner mounting ring is disposed for rotation within the drive belt assembly housing for rotation relative to the inner surface thereof and having a tensioner mounting ring inner surface extending circumferentially to define an opening through which the rotatable drive pulley of the motor-generator unit extends.

15. The accessory drive system of claim 10, wherein the tensioner mounting ring is disposed for rotation about an outer surface of the drive belt assembly housing for rotation relative thereto.

16. The accessory drive system of claim 15, further comprising:

a tensioner arm pivotally mounted, in fixed relationship with the motor generator unit at a first end;

a second tensioner pulley mounted for rotation at a second end of the tensioner arm and configured to engage the drive belt; and a biasing member associated with the tensioner arm and configured to bias the tensioner pulley into engagement against the drive belt on a second side of the motor-generator unit drive pulley.

17. The drive belt tensioner assembly for a motor-generator unit of claim 10, wherein the biasing assembly further comprises:

a biasing member exerting a biasing force the tensioner mounting ring; and a dampening assembly associated with the biasing member to prevent rapid compression of the biasing member caused by rapid transient force input to the first tensioner pulley by the motor-generator unit acting on the drive belt.

18. The drive belt tensioner assembly for a motor-generator unit of claim 17, wherein the biasing member comprises a compression coil spring and the dampening assembly comprises a hydraulic cylinder configured to apply a velocity sensitive damping on the tensioner mounting ring.

* * * * *